United States Patent [19]
Morano

[11] Patent Number: 6,074,489
[45] Date of Patent: *Jun. 13, 2000

[54] PROCESS FOR RECRYSTALLIZING SUGAR AND PRODUCT THEREOF

[75] Inventor: James R. Morano, Somerset, N.J.

[73] Assignee: Chr. Hansen, Inc.

[ * ] Notice: This patent is subject to a terminal disclaimer.

[21] Appl. No.: 09/114,201

[22] Filed: Jul. 13, 1998

Related U.S. Application Data

[63] Continuation of application No. 08/703,091, Aug. 26, 1996, Pat. No. 5,779,805, which is a continuation of application No. 08/258,110, Jun. 10, 1994, Pat. No. 5,549,757.

[51] Int. Cl.[7] .............................. C13D 1/08; C13D 1/12; C13J 1/08; C08B 30/00; C13F 1/04
[52] U.S. Cl. ................................ 127/42; 127/2; 127/5; 127/6; 127/29; 127/63
[58] Field of Search ................................ 127/42, 2, 5, 6, 127/29, 63

[56] References Cited

U.S. PATENT DOCUMENTS

| | | | |
|---|---|---|---|
| 2,429,964 | 10/1947 | Schopmeyer et al. | 127/34 |
| 2,824,808 | 2/1958 | Gillett et al. | 99/134 |
| 3,194,682 | 7/1965 | Tippens et al. | 127/30 |
| 3,365,331 | 1/1968 | Miller et al. | 127/30 |
| 3,486,469 | 12/1969 | Recas | 127/58 |
| 3,518,095 | 6/1970 | Harding et al. | 99/141 |
| 3,639,169 | 2/1972 | Broeg et al. | 127/29 |
| 3,704,137 | 11/1972 | Beck | 99/140 R |
| 3,709,731 | 1/1973 | Kingma | 127/58 |
| 3,816,175 | 6/1974 | Melaja | 127/60 |
| 3,880,668 | 4/1975 | Miller et al. | 127/9 |
| 3,929,503 | 12/1975 | Yamauchi | 127/58 |
| 3,932,615 | 1/1976 | Ito et al. | 424/80 |
| 3,972,725 | 8/1976 | Nicol | 127/58 |
| 3,983,862 | 10/1976 | Spriet | 127/58 |
| 4,009,045 | 2/1977 | Petri | 127/16 |
| 4,059,460 | 11/1977 | Schollmeier et al. | 127/29 |
| 4,162,926 | 7/1979 | Veltman et al. | 127/62 |
| 4,303,684 | 12/1981 | Pitchon et al. | 426/312 |
| 4,362,757 | 12/1982 | Chen et al. | 426/599 |
| 4,388,350 | 6/1983 | Chen et al. | 426/658 |
| 4,423,085 | 12/1983 | Chen et al. | 426/632 |
| 4,468,409 | 8/1984 | Metzroth | 426/659 |
| 4,640,717 | 2/1987 | Shukla et al. | 127/58 |
| 4,820,534 | 4/1989 | Saleeb et al. | 426/96 |
| 4,931,101 | 6/1990 | Leleu | 127/60 |
| 5,015,297 | 5/1991 | Patrick et al. | 127/58 |
| 5,075,291 | 12/1991 | DuRoss | 514/60 |
| 5,076,853 | 12/1991 | Leleu | 127/58 |
| 5,080,923 | 1/1992 | Martin, Jr. et al. | 426/658 |
| 5,133,807 | 7/1992 | De Cremoux | 127/15 |
| 5,139,795 | 8/1992 | DuRoss | 426/3 |
| 5,158,789 | 10/1992 | DuRoss | 426/3 |
| 5,518,551 | 5/1996 | Battist et al. | 127/58 |
| 5,549,757 | 8/1996 | Morano | 127/42 |
| 5,779,805 | 7/1998 | Morano | 127/42 |

OTHER PUBLICATIONS

Buss, "Buss Extrusion Technology". Pamphlet month/year N/A.

Leao, Francisco, "Production of Amorphous Refined Sugar in Brazil", pp. 1246–1255, month/year not avail.

*Primary Examiner*—Mark L. Bell
*Assistant Examiner*—Patricia L. Hailey
*Attorney, Agent, or Firm*—Godfrey & Kahn, SC.

[57] ABSTRACT

The invention is a process for recrystallizing sugar. The invention involves admixing a first quantity of a powdered sugar and a second quantity of an adjuvant, such as an invert sugar, to provide a sugar blend. The sugar blend has up to about 3 percent moisture. The invention then involves mixing the sugar blend with a high shear extruding means at a temperature between about 220° F. and about 300° F. with a residence time in the extruding means of between about 0.5 second and about 12 seconds. The invention includes the product of a combined phase recrystallized sugar.

21 Claims, 4 Drawing Sheets

PROCESS FOR RECRYSTALLIZING SUGAR AND PRODUCT THEREOF

This application is a continuation of U.S. application Ser. No. 08/703,091 filed on Aug. 26, 1996 and now U.S. Pat. No. 5,779,805, which is a continuation of U.S. application Ser. No. 08/258,110 filed on Jun. 10, 1994, now U.S. Pat. No. 5,549,757.

BACKGROUND OF THE INVENTION

1. Field of the Invention

This invention relates to processes for recrystallizing sugars and products thereof. Specifically, this invention relates to a low moisture process for high shear mixing of a powdered sugar and an adjuvant such as an invert sugar or molasses and the products thereof.

2. Description of the Background Art

A variety of sucrose crystalline transformation processes are known. These procedures concentrate a sugar syrup by evaporative boiling until the syrup becomes supersaturated. The feed stock sugar syrup is concentrated to an excess of 90 percent solids. Nucleation of crystals is then induced by mechanical means. The initiation of nucleation and the cooling of the supersaturated sugar syrup permits crystallization to proceed very quickly. In order to prevent the formation of a solid mass of sugar crystals, it is necessary to agitate the sugar syrup during crystallization. Agitation is normally achieved by stirring the crystallizing sugar mass with paddles. Such paddles often provide the required nucleation for these transformation processes. Sucrose crystallization is exothermic, because of the positive heat of crystallization, and the liberated heat can be sufficient to evaporate most of the remaining water in the sugar syrup. The resulting "transformed" or crystallized sugar can then be dried to less than 1 percent moisture, milled, and sized in separate operations. The individual grains of transformed sugar are clusters of microsized crystals of sucrose and contain all of the soluble non-sugar solids (i.e., impurities) present in the original syrup.

U.S. Pat. No. 3,365,331 to Miller et. al. discloses a sugar process and product. The invention of this patent is a sugar crystalline transformation process for making dry sugar products comprising agglomerates of fondant-size sucrose crystals. Fondant-size sucrose crystals are from 3 to 50 microns. A liquid sucrose feed stock containing 3 to 15 percent by weight soluble nonsucrose solids, based on the solids content of the syrup, is vacuum concentrated to 91 to 97 percent solids and maintained at a temperature of 120° C. to 130° C. so as to avoid premature crystallization. The supersaturated feed sugar syrup is then transformed in a beater-crystallizer device. A beater-crystallizer device is a means for providing a high-intensity combination of impact, turbulence, and shear to nucleate and rapidly crystallize the sugar syrup. The advantages of this beater-crystallizer device are attainable only if a forced and measured co-current air flow is used to, (1) remove the moisture released as water vapor, and (2) cool the product during the impact beating. The paddle velocity at the center of the blade area must be in the range of 50 to 85 feet per second and the air flow must be in the range of 9 to 20 cubic feet of air per pound of sugar solids throughput. The average particle retention time in the beater-crystallizer device is 10 to 60 seconds. The emerging product has a moisture content of 1.5 to 2.5 percent and must be further dried, ground, and sifted.

A disadvantage of the agglomeration processes, such as that of the Miller et al. '331 patent, is the effect of the humidity level of the forced air flow within the impactor on crystallization efficiency. In hot, humid regions, such as the Louisiana delta, Florida, and other tropical climates, it is almost impossible for a beater-crystallizer device to function properly unless the air is first dried. Such drying is undeniably expensive because of the amount of air flow required in these processes. Also, a significant amount of energy is required to reduce the size of the crystallized sugar mass in the crystallizing zone of the impactor.

U.S. Pat. No. 3,972,725 to Nicol discloses a production of crystalline sugar. A feed sugar syrup in this invention is prepared to the same specifications as those cited in the Miller '331 patent. The hot, supersaturated syrup is subjected to a shear force having a velocity gradient of at least 5000 cm/sec/cm and, preferably, at least 20,000 cm/sec/cm by passing the supersaturated syrup through either a colloid mill or a homogenizer to induce nucleation. The residence time of the feed sugar syrup in this operation is no greater than one second.

U.S. Pat. No. 4,640,717 to Shukla et. al. discloses a sugar process. The process of this patent is related to the process of the Nicol '725 patent, but a twin-screw extruder provides shear. The twin-screw extruder provides a progressive nucleation of the feed sugar syrup with an average retention time below 25 seconds for the feed sugar syrup. The nucleated syrup in this process, as well as in the process of the Nicol '725 patent, is immediately discharged before substantial, if any, crystallization has occurred. The nucleated syrup is expelled in a thin layer onto a moving conveyor belt where essentially all of the exothermic crystallization occurs quiescently and without agitation. The crystalline transformation process normally occurs within about five minutes as the product cools and hardens on the conveyor belt. The product is scraped from the conveyor belt and commonly has a moisture content of about 4 percent by weight. The transformed sugar crystals must be further dried, particulated, and screened.

A disadvantage of transformation procedures, such as the Nicol '725 and the Shukla et al. '717, is that the crystallization step must occur "quiescently." This disadvantage does not allow for the use of agitation, which is often a desired procedure in the development of very fine crystals at a rapid rate. In addition, if the nucleated syrup discharged onto the conveyor belt cools too fast, a substantial portion of the syrup can be transformed into an amorphous "sugar glass" with a relatively higher moisture content than the normal desired crystals.

A disadvantage of sugar crystalline transformation processes is the stochastic or random nature of nucleation. Consequently, the control of crystallization in these processes is considered more of an art than a science. These processes are difficult to maintain in equilibrium during continuous production of crystallized sugar.

Another disadvantage with sugar transformation processes is the common requirement for further drying of the crystallized product. Such "post-crystallization drying" is expensive because of the cost of the necessary capital equipment and the use of energy.

Known sugar transformation processes provide unsatisfactory results with the presence of small amounts of foreign matter, including dust particles, entrapped air, or crystals from localized cooling. These conditions can lead to premature nucleation. If a supersaturated syrup is high in soluble impurities, only a few crystals are induced, which then grow to be relatively large in size. When such a feed sugar syrup is introduced into a shearing apparatus, such as an impactor or a colloid mill, the rate of crystallization is slowed. This condition results in the formation of large, relatively wet crystals.

SUMMARY OF THE INVENTION

The invention is a process for recrystallizing sugar. The invention involves admixing a first quantity of a powdered sugar and a second quantity of an adjuvant. The adjuvant is, desirably, an invert sugar. The admixing of the sugar and adjuvant provides a sugar blend. The sugar blend has up to about 3 percent moisture. The invention then involves mixing the sugar blend with a high shear extruding means at a temperature between about 220° F. and about 300° F. with a residence time in the extruding means of between about 0.5 and about 12 seconds.

The invention is an improved process for manufacturing sugar products containing aggregates of fondant-size sucrose crystals. The process can be applied to a large variety of sucrose-containing solids or liquids and can manufacture a large variety of sugar-containing products at low to intermediate production volumes with minimal equipment changeover requirements.

The products of the invention are granular, free-flowing, and non-caking. Additionally, the products are readily dispersed and/or dissolved in water.

DESCRIPTION OF THE INVENTION

Figure 1:
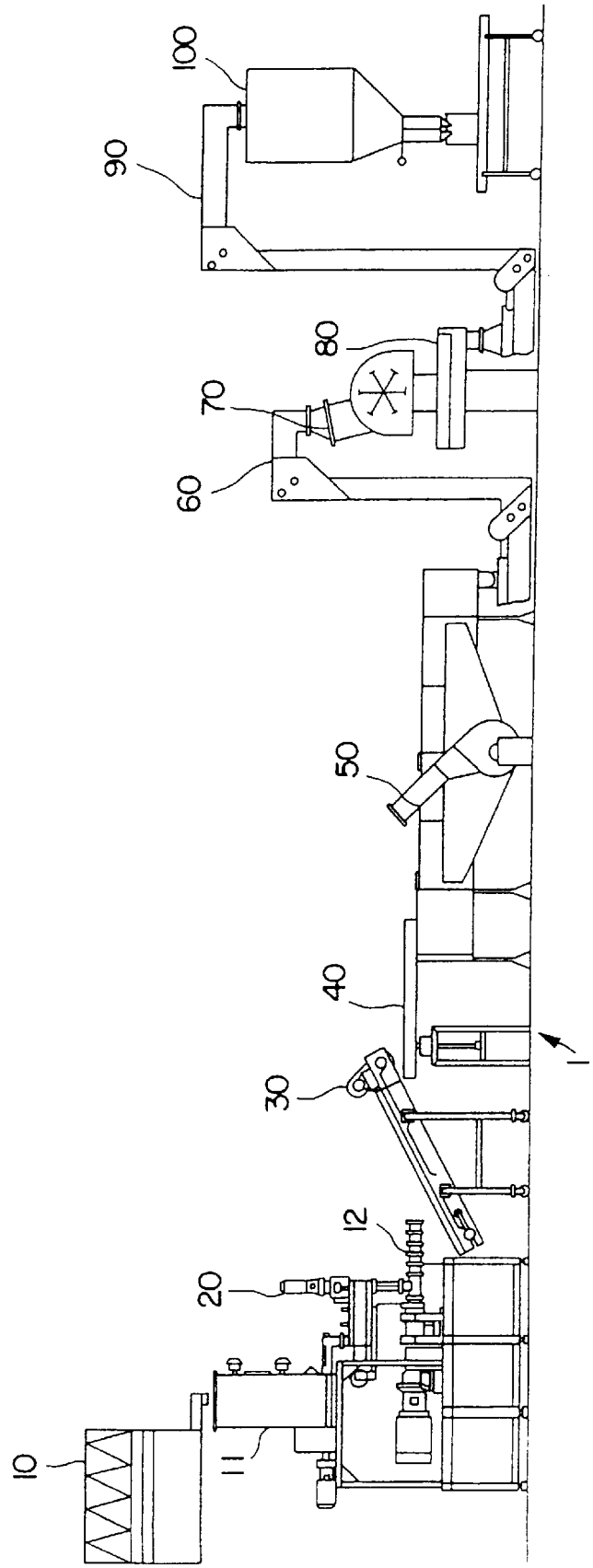
FIG. 1 illustrates a system plan view for performing the preferred embodiment of the process of the invention.

The process of the invention prepares a quantity of a powdered crystalline sugar containing up to about 3 percent moisture on a total weight basis and up to about 15 percent soluble nonsucrose solids on a dry weight basis. The minimum amount of moisture required by this process is dependent on the physical and chemical properties of the sugar,, but the moisture concentration is generally greater than 0.75 percent and, most commonly, greater than 1 percent. The (concentration of soluble nonsucrose solids can be zero. A desirable embodiment of the invention provides dry, agglomerated, fondant sugars, that are desirable for the confectionery industry, from a feed sugar that is substantially free of soluble nonsucrose solids. The crystalline sugar, that is most desirable for use with this invention, is refined white sugar. Suitable white sugar can be from either sugar cane or sugar beets. Refined crystalline sugar is essentially pure sucrose and has a composition of at least about 99.8 percent sucrose with about 0.04 percent moisture and about 0.02 percent ash. This granulated sugar is a fungible article of commerce and the form of sugar most commonly used by consumers and industry.

A crystalline sugar for use with this invention must be of a suitable particle size. Granulated sugar, for example, is milled to a powder wherein at least about 50 percent of the granules pass through a 200 mesh screen, at least about 70 percent pass through a 150 mesh screen, and at least about 85 percent pass through a 100 mesh screen. More preferably, the crystalline sugar is ground such that at least 92 percent of the granules pass through a 200 mesh screen. Most preferably, and as a critical requirement when preparing dry fondant aggregates by the present invention, at least about 99 percent of the granules pass through a 325 mesh screen. The particle size distributions described above are weight percentages.

A desirable embodiment of the invention feeds the powdered crystalline sugar described above to a ribbon blender. A desired concentration of moisture is then added by blending. Moisture can be added as water or, preferably, as a syrup or aqueous solution of edible solids. The syrup or aqueous solution of edible solids is, desirably, saturated at ambient temperature. The soluble nonsucrose solids can be added as all or any portion of the soluble solids of a syrup. The amount of moisture in the finished admixture is up to about 3 percent, preferably, up to about 2.75 percent, and, most preferably, up to about 2.5 percent. The level of soluble nonsucrose solids based on the total solids content of the final admixture is up to about 15 percent, preferably, up to about 12 percent, and, most preferably, up to about 10 percent.

The moisture-containing component, of liquid syrup, or aqueous solution of edible solids admixed with the sugar can include a member selected from the group consisting of sucrose, invert syrup, whole sugar cane juice or concentrate, sugar beet juice concentrate, refiners syrup, molasses, and mixtures of these. Also, the liquid syrup or aqueous solution of edible solids can be a starch conversion product, such as a member selected from the group consisting of maltodextrins, regular corn syrups, high fructose corn syrups, dextrose, fructose, and mixtures of these. Polyols such as glycerine, xylitol, mannose, sorbitol, mannitol, as well as hydrogenated starch conversion products can be employed as a moisture-containing component. Other moisture-containing components can be various natural syrups not of sugar cane or sugar beet origin such as honey, maple syrup, malt extract, sweet sorghum syrup, fruit juice concentrates, and the like. Other simple and complex soluble carbohydrates such as lactose, maltose, trehalose, and polydextrose can be used. Blends of two or more of these moisture containing-components can be employed in the invention.

Other additives can be included in the sugar blend to add a taste, a color, a medicinal activity, or a functional food value. Examples of such additives include: natural and artificial flavors, such as botanical flavor extractives; high-intensity natural and artificial sweeteners, such as aspartame, glycyrrhizin, stevioside, saccharin, acesulfame K, and cyclamate; natural and artificial colors; vitamins and pharmaceutical preparations; and various functional food ingredients such as gums and hydrocolloids.

Other crystalline sucrose materials or "substrates" can be substituted in whole or in part for refined, white, granulated sugar. Optionally, some or all of the soluble nonsucrose solids and/or moisture content of the sugar blend can be derived from impure or less refined sugars. For example, the crystallized solids prepared from whole sugar cane or sugar beet juice, that has been concentrated nearly to dryness, can be used in the invention. These crystallized solids contain all of the soluble components of the original sugar cane juice or sugar beet juice and are known as "Concrete Sugars" or, as "noncentrifugal or undrained sugars." These products are commercially available under various names, depending on the country of origin. For example, "areado" is from Brazil, "gur" is from India, "panella" and "raspadura" are from Central America. Direct consumption centrifugal sugars contain relatively modest amounts of impurities and are well suited for use in this invention. In the United States, these products are known as "edible washed raws" and "plantation granulated sugars" and are off-white or yellow in color. Examples include commodities known as "turbinado" and "demerara" in the United States. Various impure sugars produced within refinery operations can also be employed in the invention. Examples include soft brown sugars and painted brown sugars. These brown sugars are made by boiling and coating procedures, respectively. Refinery brown sugars are significantly higher in nonsucrose impurities than plantation direct consumption sugars.

Also, various crystallized sucrose products, which are not from sugar cane or sugar beets, are useful in the invention. Examples include crystallized maple sugar and sucrose crystallized from the juice of the sweet sorghum plant.

An impure sugar that contains in excess of 3.0 percent moisture or greater than 15 percent nonsucrose solids on a dry weight basis can be modified for use with this invention. Such a sugar can be blended with either a refined or less impure granulated sugar to provide a combined sugar that meets the requirements of this invention. The nonsucrose solids fraction can be blended with the crystalline sucrose substrate either prior to or after a grinding or milling step. Examples of nonsucrose soluble solids in dry form for use with the invention include a member selected from the group consisting of corn syrup solids, granular sorbitol, dehydrated malt extract, maltose powder, honey or fruit juice concentrates spray dried in combination with a maltodextrin carrier, and combinations of these.

The process of the invention involves blending or admixing an appropriately powdered crystalline sugar with water or a water-containing component or adjuvant to provide a sugar blend. The sugar blend has up to about 3 percent moisture. Desirably, the water-containing component is an invert sugar or molasses. The process then involves mixing the sugar blend with sufficient shear and at a sufficient temperature to establish a combined liquid phase and solid phase of the sugar blend. Desirable extruding means impart a high shear at a temperature between about 220° F. and about 300° F. Desirably, the mixing is performed by a cooker-extruder.

The fondant sugar, adjuvant, and any additives must be selected such that they do not degrade at the operating temperature of the extruder means. In particular, sugars must have a glass transition point above the operative temperature. For example, maltose and maltodextrins form an amorphous state below 300° F. and do not recrystallize. However, maltose and maltodextrins can be used as adjuvants that are uniformly dispersed into a fondant sugar via the recrystallization process of this invention. Desirable fondant sugars have a glass transition point above the operating temperature of the extruding means. This temperature is desirably above 225° F. and preferably above 300° F.

The sugar blend, desirably, has a residence time in the extruding means of between about 0.5 and about 12 seconds. The residence time can be as low as 0.5 second when the extruding means is a single-screw cooker-extruder. The residence time can vary depending upon the screw-shaft diameter. For example, at the same revolutions per minute, a small diameter shaft provides a slower throughput or longer residence time than does a large diameter shaft.

The sugar blend must be fed to the extruding means with a continuous positive pressure. A failure to provide a continuous positive pressure permits the sugar blend to clog and back up the feed port to the extruding means. Various positive pressure feeding means, such as conveyor screws, can be used.

The extruding means for most commercial applications of the invention is a cooker-extruder. However, a jacketed "Littleford" mixer can be used to mechanically fluidize a sugar blend. This mixer has a shaft with plow blades in a cylinder. The plow blades rotate at a high speed, but pressure within the cylinder is not elevated as in an extruder. A high shear is created by the mixer. The jacketed cylinder heats the sugar blend and, also, cools the sugar blend before it exits the cylinder. A vacuum must be drawn at the exit of the mixer in order to flash-off moisture or spontaneously dehydrate the sheared sugar blend. A vacuum band dryer is suitable for this function and can, also, be used to enhance the spontaneous dehydration procedure with a cooker-extruder.

The admixing procedure is accomplished in the preferred embodiment of the invention by charging a quantity of the appropriately powdered crystalline sucrose to a suitable mixing means, such as a ribbon blender. If moisture is to be incorporated into the powdered crystalline sucrose, it can be added as potable water, an aqueous solution, or a saturated syrup. When all of the desired nonsucrose solids are already present within, or by way of prior addition to, the powdered crystalline sucrose, only water need be added to the sugar blend. However, the direct addition of water to the sugar blend can be undesirable because it dissolves some of the original powdered crystalline sucrose. Therefore, the most preferred procedure is to add the required amount of water as a saturated syrup.

When moisture is added to the sugar blend as part of an aqueous liquid, the aqueous liquid can simply be poured onto the powdered crystalline sucrose and blended for about 5 to about 15 minutes, or until a substantially uniform mixture is achieved. Upon mixing, the aqueous liquid gradually forms clusters or "syrup balls" by causing the powdered crystalline sucrose particles to adhere to the surface of the aqueous liquid. The final sugar blend is often discontinuous in its physical appearance. To improve the flow characteristics and physical continuity of the feed of sugar blend, the aqueous liquid can be sprayed or atomized into the powdered crystalline sucrose with agitation. The aqueous liquid is thereby incorporated in the form of fine droplets or a mist. This procedure for adding moisture results in the generation of a large number of miniature aggregates as the powdered crystalline sucrose substrate adheres to the substantially enhanced surfaced area of the syrup or other aqueous liquid.

The temperature of the aqueous liquid during a spraying procedure is not critical. However, it is desirable for the temperature to be room temperature or at least 50° F. Otherwise, the viscosity of the aqueous liquid can be too great for convenient handling and atomizing purposes. Also, a maximum desirable temperature is up to about 160° F. Above this temperature moisture can be lost during the spraying procedure. The temperature of the moisture-containing liquid, preferably, is up to about 150° F. and, most preferably, is in the range of about 95° F. to 125° F.

The finished admixture or sugar blend is an aggregate of the powdered crystalline sugar and has a temperature at or only slightly above ambient conditions. The sugar blend is, therefore, stable and can be stored for an extended time before further processing. The holding time for the sugar blend is typically about 30 minutes to about 150 minutes. This condition is in contrast to the hot, supersaturated syrup feed of the background art transformation processes, which is held at 250° F. and subsequently incurs significant sugar degradation within a relatively short time.

The invention includes a "combined phase recrystallization process." This process provides a thermoreversible phase change by effecting the partial dissolution, uniformation, and recrystallization of the powdered crystalline sugar feed or "sugar blend." The process employs an extruding means. The extruding means provides a controlled combination of temperature, shear, and pressure differential to: (1) effect an intermediate and temporary increase in liquid to solid ratio of the sugar blend with a very uniform mixing; and (2) provide the conditions for a spontaneous recrystallization and rapid dehydration. The preferred apparatus or extruder means for the process is a continuous cooker-extruder such as that manufactured by Extru-Tech, Inc., of Sabetha, Kans.

FIG. 1 illustrates a system 1 for performing the preferred embodiment of the process of this invention. A mixing means 10 admixes the components of the sugar blend. The mixing means 10 is desirably a ribbon blender. The sugar blend is fed from the mixing means 10 to an extruding means 20. The product of the invention exits the extruding means 20 onto a first conveying means 30 and is transported to a spreader means 40. From the spreader means 40, the product travels through a cooling means 50 to a second conveying means 60. The second conveying means 60 transports the product to a milling means 70 and then a sifting means 80. A third conveyor means 90 transports the product from the sifting means 90 to the packaging means 100.

The operation of the system 1 is best understood by describing the preferred embodiment of the invention. A sugar blend is formed by admixing one gallon or 11.745 pounds of brown sugar molasses to each 100 pounds of powdered sugar. The powdered sugar is granulated white, refined sugar milled so that at least 99 percent passes through a 325 mesh screen and charged to a ribbon blender. A mixture of plantation and/or refinery sugar cane molasses and syrups is separately prepared to provide the final desired color and flavor of a light brown sugar. This "brown sugar molasses" blend is heated to 120° F. and atomized into the powdered sugar with agitation. The combined sugar blend is then mixed for an additional 5 minutes. The final powdered crystalline sugar feed or "sugar blend" contains 2.3 percent moisture on a wet weight basis and has a sucrose purity content of 94 percent on a dry weight basis and is charged to a holding bin 11 of the extruding means 20. The preferred extruding means is a cooker-extruder 12.

The sugar blend has a relatively low percentage of liquid phase to a comparatively large percentage of solid phase. The solid phase, itself, has a tremendously high total surface area because of its fine granule size. This discontinuous mass of syrup clusters and powdered sugar is transformed into a unified, dry composition of free-flowing, brown sugar, microcrystalline agglomerates.

The solubility of sugar at a given moisture content increases with temperature. Therefore, as the temperature of the feed mass or sugar blend is elevated, sugars are solublized and the liquid phase to solid phase ratio increases. The temperature of the feed mass is commonly increased in the extruding means to a point at which about 33 percent of the original wet weight composition is in the liquid phase. This concentration of syrup, with adequate shearing conditions, is more than sufficient to allow the feed mass to reach physical uniformity in the extruding means. This elevated temperature not only reduces the viscosity of the high solids liquid, but also applies a uniform coating of the liquid phase syrup over the surface of the equally hot, solid phase. An instantaneous decompression or decrease in pressure occurs as the hot, uniformly dispersed, extruded mass exits the extruding means. The hot, extruded mass releases or "flashes-off" moisture as it exits the extruding means. This dehydration or drying process is accompanied by a corresponding decrease in temperature due to evaporative cooling and a recrystallization of the supersaturated syrup solids.

Figure 2:
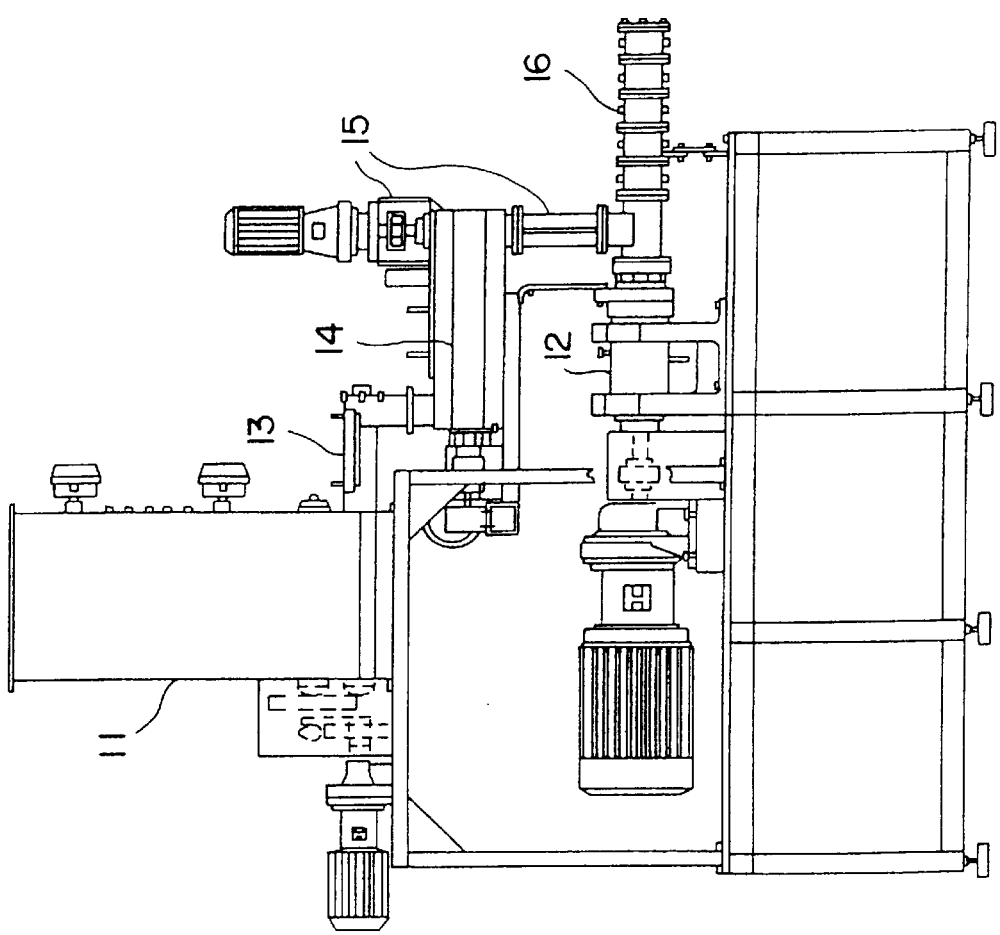
FIG. 2 illustrates the preferred cooker-extruder system for the process of the invention.

FIG. 2 illustrates the preferred extruding means 12 for use with this invention. A sugar feed composition or sugar blend is held in a "live bottom surge bin" or holding bin 11. A horizontal screw feeder 13 removes the feed product from the holding bin 11 and, desirably, conveys it to a conditioning chamber 14. The conditioning chamber 14 transfers the sugar blend to a vertical feed screw 15. The vertical feed screw 15 forces the sugar blend into the extrusion section 16 of the extrusion means 12. The extrusion means 12 of this embodiment is a cooker-extruder.

Figure 3A:
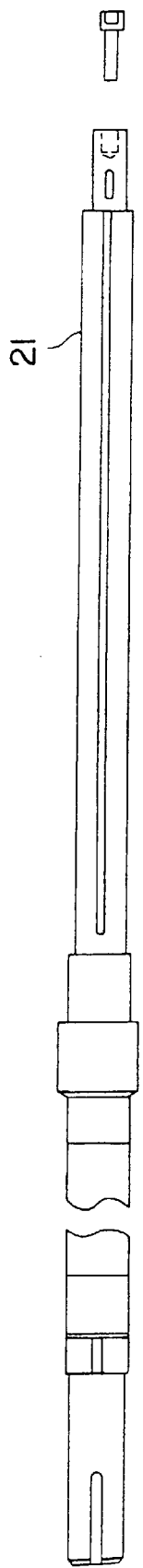
FIGS. 3a, 3b, and 3c illustrate a cross-sectional view of the extruder barrel of the cooker-extruder system of FIG. 2.
Figure 3B:
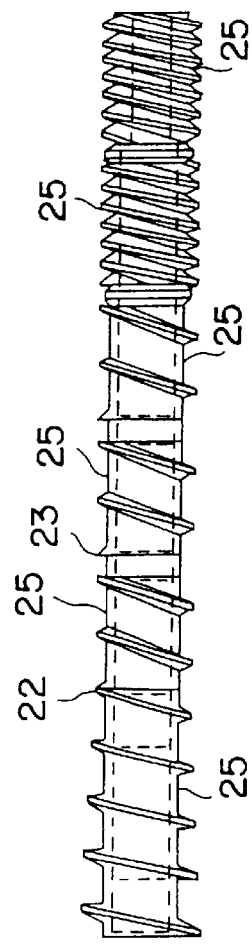
Figure 3C:
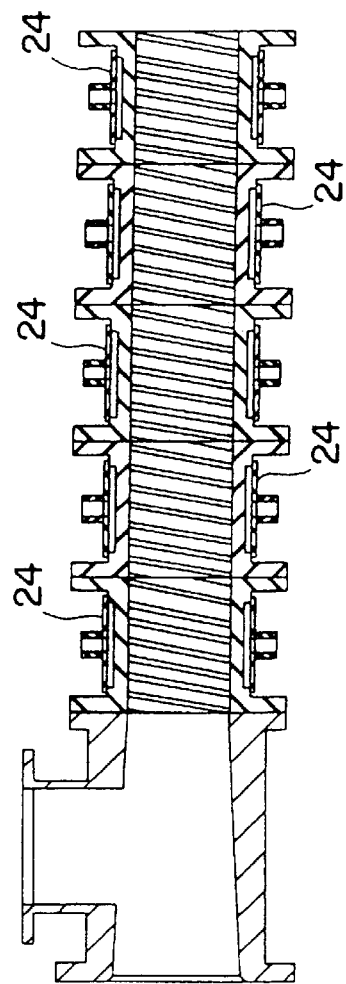

FIGS. 3a, 3b, and 3c illustrate a cross-sectional view of the preferred extruding means 12. A desirable extruding means 12 can be a continuous cooker-extruder with one or two rotating screw-shaft elements. A single screw-extruder is preferred over a twin-screw extruder because of its significantly lower capital cost without any discernible processing drawbacks. As depicted in FIG. 3a, the extrusion section of a single-screw unit is driven by a central longitudinal shaft 21 onto which screw segments 22 and steamlocks 23 are affixed. The screws 22 and steamlocks 23 are arranged to provide a progressively tighter pitch and greater resistance from the inlet zone to the outlet zone. This arrangement results in the development of a continually increasing pressure gradient. The barrel segments 24 are consecutively affixed onto the extruder housing and are jacketed to receive either steam or cooling water. These jacketed barrels assist in the development and control of a continually increasing temperature gradient. Each screw segment 25 is positioned within a corresponding barrel segment 24 to make up a designated zone. The screw shaft 21 revolves at variable speeds within the barrel to establish the required shearing conditions.

The cooker-extruder shown in FIGS. 2 and 3 is a single-screw extruder having six zones. Each zone is provided with a separate double jacket. The first zone from the extruder means 12 is the inlet zone and the last zone is the discharge zone. The jackets of zones two and three of the extruder means 12 are water cooled, whereas the jackets of the last three zones are heated to specified temperatures. The inlet zone contains a wide flight tapered screw designed to direct the feed mass into the barrel housing. Zones two, three, and four desirably have screws with intermediate flight spacings intended to convey and compress the mass. Zones five and six are equipped with "tight flight" screws. The tight flight screws work and compress the mass. The discharge zone includes an exit die head. The exit die head contains multiple hole outlets to release the extruded mass to the atmosphere.

The powdered crystalline sugar feed or sugar blend is charged to the inlet zone of the extruder means 12. Due to the extremely high total surface area and low moisture content of the sugar blend, particle-to-particle friction caused by the mechanical shear of the rotating screw shaft 21 generates sufficient heat to rapidly increase the temperature of the mass in the extruder barrel. If the sugar mass is heated up too quickly, various feed-flow problems, including the possibility of material blow-back, can occur.

FIGS. 2 and 3 illustrate that zones two and three are water-cooled jackets that decrease the rate of temperature rise of the sugar mass and prevent the above-described problems. Even with these water-cooled jackets, the temperature of the sugar mass in zones two and three is generally about 140° F. and about 180° F., respectively. The material in zone two is further compounded in the form of a tacky or sticky powder and advanced to zone three. In zone three, as the temperature of the sugar mass is increased from friction within the extruder barrel, the sugar mass develops a heavy, dough-like consistency which is kneaded and conveyed to zone four. In zone four, the material is compressed and cooked to a fluid paste of uniform composition. Zones four, five, and six have steam-heated jackets that rapidly dissolve the solid phase and, correspondingly, increase the amount of liquid phase. The temperatures of zones four and five are usually controlled so as to be at about 90 percent and about 95 percent, respectively, of the temperature in the zone six outlet. The product in zones five and six is in the form of a massecuite which has been brought to a temperature and pressure such that, upon discharge from the exit die head, an explosive decompression occurs. The decompression, subsequently, causes the desired spontaneous recrystallization and rapid dehydration of the extruded sugar product.

The characteristics of the massecuite or "extruded sugar product" at the exit die head is an important aspect of the present invention. This massecuite in the preferred embodiment of the invention is a continuous phase of high-solids syrup into which a large number of undissolved sugar microcrystals are uniformly dispersed. At the discharge point of the cooker-extruder, the massecuite still contains at least 40 percent by weight, and, preferably, 50 percent by weight, of sugar microcrystals. Typically, and most preferably, this extrudate contains greater than 60 percent by weight in sugar microcrystals. This fact is significant because it illustrates that a substantial portion of the original pulverized crystalline sucrose substrate is passed through the extrusion system in its original form and that nucleation does not occur, and indeed is not even necessary, by this process.

The temperature and pressure of the massecuite at the exit die head is controlled such that, upon its discharge, the associated explosive decompression and exothermic recrystallization combine to cause a sufficient "flashing-off" and evaporation of water so as to result in a final sugar product having a moisture content of 0.7 percent or less. The desired temperature and pressure at discharge depend on the moisture and nonsucrose solids composition of the sugar blend that is fed into the extruding means. The temperature of the sugar product at discharge is between about 220° F. and about 300° F., preferably between 235° F. and 285° F., and most preferably between 250° F. and 270° F. The pressure developed at discharge is about 20 to 1,200 pounds per square inch (psi), preferably 100 to 1,000 psi, and most preferably 200 to 800 psi. The screw shaft speed is operated at a constant revolutions per minute (RPM) which depends on the particular processing characteristics of each feed sugar composition. In most cases, the shaft speed is set towards the upper end of the operational limit for that extruding means so as to obtain the maximum product throughput. The operating shaft speed of the preferred extruding means is 100 to 500 RPM, preferably 250 to 450 RPM, and most preferably 320 to 420 RPM. The effective shaft length to outside diameter ratio for the preferred cooker-extruder must be great enough to allow for ample temperature and pressure development of the sugar mass in the extruder barrel. The length to diameter ratio in the preferred extruding means must be at least 6.5, preferably at least 8.0, and most preferably greater than 9.5. Under the above conditions, and depending on the size of the extruding means, one pound of product has a residence time in the extruder barrel of less than 12 seconds, preferably less than three seconds, and most preferably, less than one second.

Figure 4B:
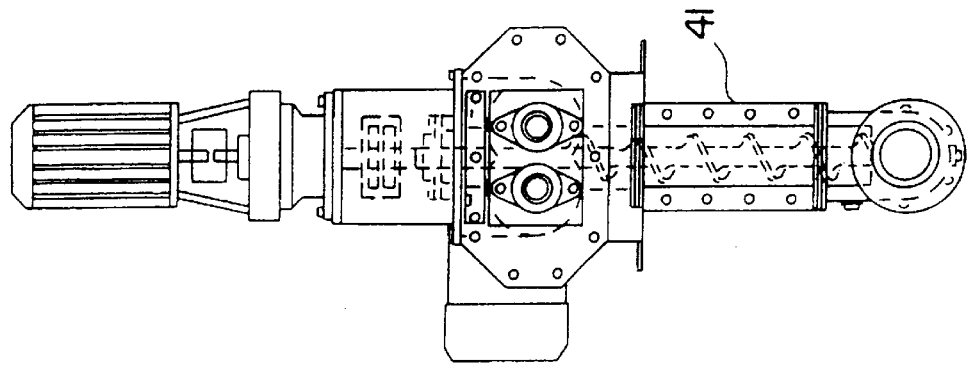
FIG. 4a and 4b illustrate a perpendicular force feeder for the cooker-extruder system of FIG. 2.
Figure 4A:
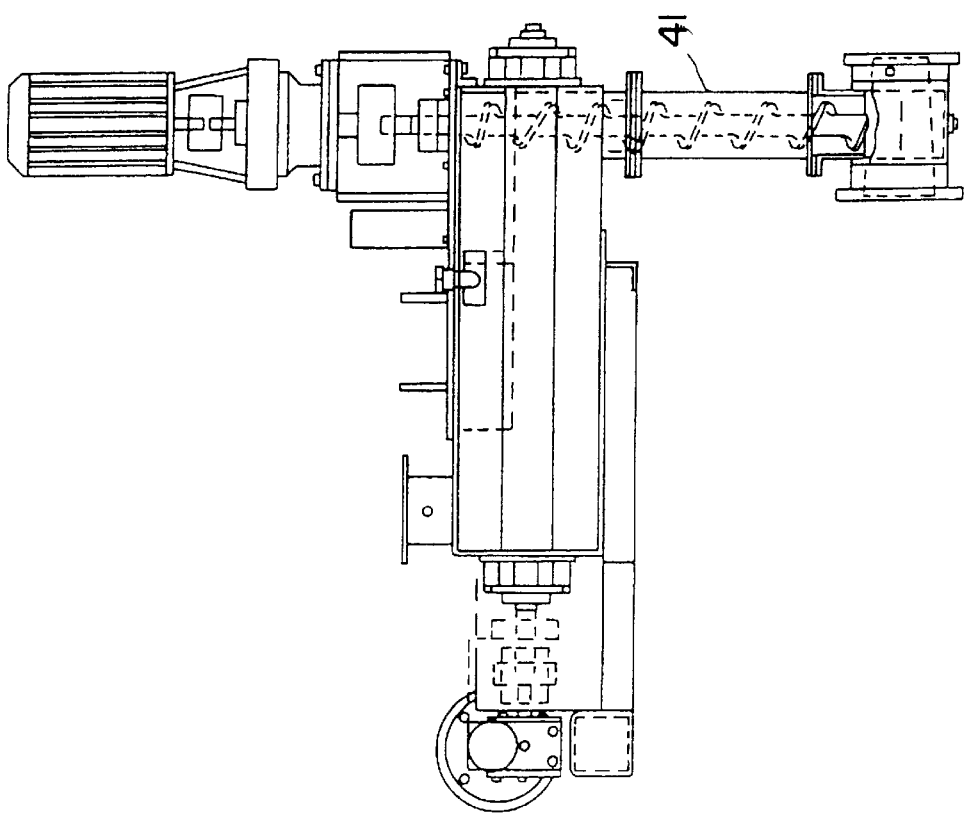

FIG. 4 illustrates a perpendicular force feeder for use in the preferred embodiment. The preferred force feeder 41 is a vertical force feed screw. Extrusion cooking of comestibles is well known and is practiced on large commercial scales in countries throughout the world. However, the feed preparation normally involves mixing starchy and/or proteinaceous raw materials with water and relatively lesser amounts of aesthetic or functional ingredients. These grain and cereal flour-based feed materials are gravity fed into the inlet zone of an extruder.

The hygroscopic nature of the powdered crystalline sugar feed used in this invention permits quick conversion into a tacky or sticky powder. The tacky or sticky powder accumulates up and bridges over in the inlet zone of the extruding means. The inlet is thereby obstructed and the feed sugar backs up through the system. The invention uses a positive pressure feeding means such as a cramming piston or stuffing screw to avoid this problem. A vertical force feed screw is preferred.

The process of the preferred embodiment is a batch or ribbon blender to continuous or cooker-extruder procedure. This arrangement is the preferred mode of the invention because it produces a wide variety of different sucrose-based and other sugar products while affording minimal cleanup time and equipment changeover requirements for different compositions.

A conditioning chamber is desirable for long processing runs of a single composition. The preferred conditioning chamber includes a dual-shaft paddle mixer where each shaft is equipped with 48 adjustable paddles. The adjustable paddles mix the product and direct its flow. Optionally, the powdered crystalline sugar substrate can be fed directly from a pulverizing or milling means into the conditioning chamber via a live bottom surge bin. A second feed stream of the aqueous liquid can be proportionately metered and atomized into the conditioning chamber. The conditioning chamber mixes the ingredients and conveys the sugar blend to the vertical force feed screw.

The hot, pressured massecuite exits the die head holes of the extruder means in the form of multiple continuous ropes. The holes in the die head are desirably about 3/16 inch in size. The number of holes in the die head depends on such factors as the sugar feed composition, production throughputs, and the desired back pressure.

The hot, pressurized massecuite undergoes an explosive decompression as it exits the die head into atmosphere. Most of the water contained in the original feed sugar blend "flashes-off" at the outlet of the die. This flash-off of water results in the simultaneous expansion of the expelled product strands. This expansion occurs by the instantaneous conversion of compressed liquid water into steam. The total volume expansion is proportional to the pressure difference between the inside of the steam bubble and the surroundings. It is common for the expelled product strands to double in volume due to the effect of water vaporization. Further, this water vapor removes the latent heat of vaporization which is reflected in a sudden cooling of the expanded strands. Within about five seconds after discharge onto the conveyor, the product completes its expansion and the temperature of the mass is reduced by over 100° F.

A substantial solid phase of sugar microcrystals exists throughout the extruder barrel. The massecuite, that is discharged at the exit die head, therefore contains a substantial quantity of internal seed crystals. This continuous presence of internal seed crystals eliminates the necessity for nucleation and serves as the "tutor" for recrystallization of the sugar. As a result of the flashing-off or vaporization of moisture at the die head and the associated drying and cooling effects, the expelled, extruded product is very supersaturated. Even though there is no agitation following discharge, the combined effect of the internal seed and the violent decompression at the die head of the extruded sugar product causes spontaneous recrystallization. The latent heat of crystallization completes the drying process of the extruded sugar product. The final sugar product is a porous, agglomerated structure of extremely small crystals. The crystals are individually and uniformly coated in the preferred embodiment with the nonsucrose solids content of the original feed suagar. In the case of the embodiment for producing brown sugar described above, the color bodies, ash content, invert sugars, and other organic nonsugars contained in the original molasses and/or refiners syrup blend are evenly dispersed throughout the total surface area of the final product.

The extrudate, upon being discharged from the final zone, is on the conveyor for about 30 to about 60 seconds for cooling. This cooling permits the strands to have sufficient physical and mechanical properties that the strands can be handled. This extruded product is transferred by way of a belt spreader into a forced air cooler for an additional 3 to 5 minutes before it is cooled to about ambient temperature and discharged. It is noteworthy that the forced air cooler requires no heating element and that the air used for cooling does not have to be conditioned for humidity. The extruded product exiting the forced air cooler is a friable solid of open or porous structure having a moisture of less than 0.7 percent, preferably less than 0.5 percent, and most preferably of less than 0.3 percent.

The dry, cool extruded product is transferred to a suitable size reduction apparatus, such as comminuting mill. The resulting finely divided product is discharged and passed into a sifting apparatus where various sized particles can be removed on the basis of sieve size. Coarse particles are returned to the mill. The grinding system is preferably designed to avoid the production of fines. However, when fines are generated, they are recycled to the ribbon blender. The aggregate product which has been sieved and accepted for size is then transferred to the packaging means.

The microcrystalline aggregates produced by the invention have desirable texture and mouth feel when dispersed in water. The products of the present invention, that are intended for use as fondants, are desirably prepared from crystalline sucrose substrates which have been pulverized to such that at least 99 percent pass through a 325 mesh screen. It has been found that such milling of sugar produces many ultrafine crystals having a particle size of below two microns. These ultrafine crystals look very much like broken glass, in that the particles are irregular and have jagged edges. These particles are known to impart an undesirable consistency and cloying sensation to the fondant. An important characteristic of sugar crystals is that the smallest particles, which possess the largest surface area per unit weight, are the first to be dissolved. As a result, in performing this process, the minor amount of water added to the feed sugar is sufficient to dissolve substantially all of the ultrafine saccharide particles having a size of less than five microns. Upon recrystallization, these sugars have a particle size distribution similar to the remaining "tutor" or internal seed microcrystals.

Another unexpected discovery is that the sugar aggregates made from the process can be reground to a granulation size wherein up to 98 percent pass through a 100 mesh screen without caking. Specifically, when the soluble nonsucrose solids content of the feed sugar contains at least 6 percent of a low dextrose equivalent, commonly 10DE, maltodextrin, it is believed that upon recrystallization of the massecuite, the maltodextrin becomes an evenly distributed layer over the entire surface area of the microcrystals. It is further believed that any other nonsucrose solids, which may be present in the formulation, become trapped within this maltodextrin layer. The maltodextrin, because of its non-hygroscopic character, acts as an effective anti-caking aid.

The invention is a process for recrystallizing sugar without requiring a hot, supersaturated syrup as the feed material. The process thereby eliminates the problems related to inducing nucleation, controlling crystallization, and further avoids the necessity for post-crystallization drying of transformed sugars. Another unexpected discovery is that fondant aggregates produced by this process demonstrate improved texture and "mouthfeel" when dispersed in water to form cream centers, icings, and fudge bases. Another unexpected result is that the sugar aggregates of certain embodiments of this invention can be subsequently pulverized without caking.

The following Examples are intended to further illustrate the invention and are not intended to limit the scope of the invention.

EXAMPLE 1

The following is an example of the preferred embodiments of the process and the product of the invention. This example provides a free-flowing, medium brown sugar fondant.

One thousand pounds (1,000 lbs.) of granulated, white, refined sugar is pulverized to an average particle size wherein at least 99 percent passes through a 325 mesh screen in a mechanical impact, air-classifier mill. The granulated, white, refined sugar is charged to a ribbon blender. A molasses/refiners syrup blend is adjusted to 79.5 Spindle Brix (11.745 lbs./gal.) and is prepared such that a 1 percent water dilution passes through a 0.65 micron filter and yields an absorbency reading at 560 nanometers of 0.200±0.020. Ten gallons of this brown sugar molasses blend is heated to 120° F. and sprayed as fine droplets into the powdered sugar substrate with agitation. The combined mass is mixed for an additional five minutes. This feed sugar admixture contains 2.3 percent moisture on a wet weight basis and has a sucrose purity level of 94 percent on a dry weight basis.

An Extru-Tech Model E325 single-screw cooker-extruder having six zones is equipped such that zones two, three, and four have intermediate flight convey/compress-type screws and zones five and six have tight flight work/pressurize screws. The unit has a 9.7 length to diameter ratio. The jacket temperatures for zones four, five, and six are set at 235° F., 250° F., and 265° F., respectively. The shaft speed runs constant at 420 RPM. The remaining zone jackets, or zones two and three, are water cooled.

The feed sugar is charged via a vertical force-feed screw to the inlet or first zone of the cooker-extruder. The average residence time in the extrusion section per pound of product is slightly less than seven seconds. The extrudate is discharged onto a conveyor belt, brought to ambient temperature in a forced air cooler, passed through a knife edge comminuting mill, and screened to the desired particle size distribution. The final product is a free-flowing, medium, brown sugar fondant having a moisture content of 0.22 percent.

EXAMPLES 2 & 3

The following are two examples of desirable alternative embodiments of the invention. The same procedures and equipment as described for Example 1 are used for these examples. These two examples also provide desirable, free-flowing, dark and light brown sugar fondants.

Example 1 is repeated with the same ingredients except that two different types of molasses/refiners syrup blends at 79.5 Spindle Brix are used. The syrup blend for Example 2 is prepared such that a 1 percent water dilution passes through a 0.65 micron filter and yields an absorbency reading at 560 nanometers of 0.600±0.050. The syrup blend for Example 3 is prepared by the same procedure so as to yield an absorbency reading of 0.065±0.005. The particle size distribution of the powdered sugar substrate for Examples 2 and 3 provide particles wherein 80 to 85 percent pass through a 325 mesh screen and 92 to 95 percent pass through a 200 mesh screen.

Both of these feed sugar admixtures contain 2.3 percent moisture on a wet weight basis. Their sucrose purity levels on a dry weight basis are 93 percent and 95 percent, respectively. The average residence time in the extrusion section per pound of product is six seconds. The final products are free-flowing dark and light brown sugars having moisture contents of 0.28 percent and 0.26 percent, respectively.

These two examples demonstrate that the characteristics of a free-flowing brown sugar can be varied by adjusting the molasses/refiners syrup blend. These examples further demonstrate that suitable free-flowing brown sugars can be prepared from medium fine, rather than fondant quality, powdered sugar substrates.

EXAMPLE 4

The following is an example of an alternative embodiment of the invention. The same procedures and equipment as described for Example 1 are used for this example. This example provides a desirable, free-flowing, dry, honey fondant.

Example 1 is repeated with the same ingredients except that ten gallons of light amber honey, as determined by U.S.D.A. color standards, replaces the ten gallons of molasses/refiners syrup blend. This honey has a solids content of 82.8 percent and a density of 11.838 pounds per gallon (lbs./gal.). The feed sugar admixture contains 1.8 percent moisture on a wet weight basis. The final product is a free-flowing, dry, honey fondant having a moisture content of 0.17 percent.

EXAMPLES 5, 6, 7, & 8

The following are examples of the alternative embodiments of the invention. The same procedures and equipment as described for Example 1 are used for these examples. These examples provide a desirable, free-flowing, bakery fondant with an attractive surface gloss.

Dry, agglomerated, white, fondant sugars are extensively used in the bakery industry for the preparation of icing and glaze formulations. Free-flowing bakery fondants are most preferred when they contain a suitable amount of invert sugar (desirably 6 to 8 percent) which imparts an attractive surface gloss or sheen as well as a beneficial resistance to surface cracking or drying.

Example 5 charges one thousand pounds (1,000 lbs.) of fondant-quality powdered sugar substrate, as that described in Example 1, to a ribbon blender. One hundred five pounds (105 lbs.) of a refined, full invert syrup having 76 percent total sugar solids including 72 percent invert sugar and 4 percent sucrose is heated to 120° F. and sprayed as fine droplets into the powdered sugar substrate with agitation. The feed sugar admixture contains 2.3 percent moisture on a wet weight basis and has an invert sugar level of 7.0 percent on a dry weight basis. The final product has a moisture content of 0.24 percent. This example provides a preferred, free-flowing, white, bakery fondant.

Examples 6, 7, and 8 use the same procedures and equipment as described for Example 5. Colored and flavored free-flowing bakery fondants are prepared by these examples with the incorporation of natural and/or artificial colors and/or flavors into the admixture. Further, stabilized, free-flowing, bakery fondants can be made by adding selected gums or hydrocolloids to the feed sugar.

Example 6 repeats the procedure of Example 5, but adds a suitable quantity of artificial color to the refined full invert syrup. The color can be selected from many commercially available sources and used according to the supplier's instructions. A colored, free-flowing, bakery fondant with an attractive surface gloss is produced. This product can be used to form a colored icing for baked food products.

Example 7 repeats the procedure of Example 5, but adds a suitable quantity of artificial flavor to the refined full invert syrup. The flavor can be selected from many commercially available sources and used according to the supplier's instructions.

Example 8 repeats the procedure of Example 5, but adds a suitable quantity of activated 250 Bloom gelatine to the refined full invert syrup. The gelatine has many commercially available sources and is used according to the supplier's instructions. A stabilized, free-flowing, bakery fondant with an attractive surface gloss is produced.

EXAMPLE 9

The following is an example of an alternative embodiment of the invention. The same procedures and equipment as described for Examples 1 and 5 are used for this example. This example provides a desirable fondant or a confectionery cream.

Dry agglomerated white fondant sugars are extensively used in the confectionery industry for the preparation of cream centers. Free-flowing confectionery fondants are most preferred when their composition is essentially pure sucrose. The product of this example provides a relatively low solids (sucrose) syrup to form a cream center which provides sufficient moisture for subsequent invertase enzyme activity.

Example 5 is repeated with the exception that 75 pounds of refined simple (sucrose) syrup is used. The simple syrup is two-thirds refined sucrose and one-third water. The feed sugar admixture contains 2.3 percent moisture on a wet weight basis and essentially zero impurities (i.e., nonsucrose solids). The final product has a moisture content of 0.14 percent.

This example provides a desirable, free-flowing, white, confectionery fondant containing essentially zero impurities. As with Examples 5 through 8, colored, flavored, and stabilized free-flowing, confectionery fondants can be easily made with the procedure of this example.

EXAMPLE 10

The following is an example of an alternative embodiment of the invention. The same procedures and equipment as described for Examples 1 and 5 are used for this example. This example provides a desirable free-flowing instant fudge base.

The preparation of a free-flowing instant fudge base requires the selection of a powdered sugar substrate that imparts a controlled and characteristic grain or "bite" to the reconstituted fudge formulation. Also, an intermediate invert sugar content is desirable so as to provide sufficient surface reflection and cracking prevention without lowering the viscosity or providing too much "creamy" character to the final instant fudge base.

Example 5 is repeated with the exception that a refined partial invert syrup having 76 percent total sugar solids containing 36 percent invert sugar and about 40 percent sucrose is used. The particle size distribution of the powdered sugar substrate is such that 88 to 92 percent of the particles pass through a 325 mesh screen, and at least 98 percent of the particles pass through a 200 mesh screen. This particle size distribution provides a suitable grain to the finished fudge and is very difficult to control when prepared directly from a hot, supersaturated syrup. The final product has a moisture content of 0.21 percent and contains 3.5 percent invert sugar on a dry solids basis.

EXAMPLE 11

The following is an example of an alternative embodiment of the invention. The same procedures and equipment as described for Example 1 are used for this example. This example provides a desirable excipient for pharmaceutical products.

Directly compressible excipients are used in pharmaceutical tabletting operations as well as for manufacturing other stamp-molded sugar forms such as breath mints and candy pellets. Such excipients are most commonly agglomerated carbohydrate matrices which preferably contain a binding ingredient. They must be free-flowing to rapidly fill a die mold and permit the maximum number of punches per minute in the stamping operation. The agglomerated matrices physically disintegrate and deaerate when compressed. The ultimate particles then flow to fill the die mold shape. The binder subsequently holds the new "macro shape" together.

Sucrose microcrystal aggregates prepared by the process of the invention are excellent direct compression vehicles, especially when crystallized in the presence of binders such as low dextrose equivalents (DE) maltodextrins.

Example 9 is repeated except that the simple syrup is replaced by a formulated syrup which contains one-third water, and 42 percent of 10DE maltodextrin with the remainder of the two-thirds solids being sucrose. The final product has a moisture content of 0.32 percent and contains 3.0 percent of 10DE maltodextrin on a dry solids basis.

EXAMPLE 12

The following is an example of an alternative embodiment of the invention. The same procedures and equipment as described for Example 1 are used for this example. This example provides a desirable tabletting sugar.

Various gums and hydrocolloids function as binders in compressible excipients that can be made by the process of the invention. One thousand pounds (1,000 lbs.) of granulated white refined sugar which has been milled to a particle size distribution such that 80 to 85 percent passes through a 200 mesh screen, 92 to 95 percent passes through a 150 mesh screen, and not less than 98 percent passes through a 100 mesh screen, is charged to a ribbon blender. Forty pounds (40 lbs.) of a 30 percent gum arabic (acacia gum) solution was heated to 150° F. and sprayed as fine droplets into the powdered sugar substrate with agitation.

The feed sugar admixture contains 2.7 percent moisture on a wet weight basis and has a gum arabic content of 1.15 percent on a dry weight basis. The final product has a moisture content of 0.41 percent.

This example provides a medium quality powdered sugar that can be used for the production of free-flowing, directly compressible sugars. Other gums and hydrocolloicds, such as gelatin, xanthan, locust bean gum, and the like, will also function as binding agents.

EXAMPLES 13, 14, & 15

The following are examples of alternative embodiments of the invention. The same procedures and equipment as described for Example 1 are used for these examples. These examples provide desirable colors and flavors.

Example 13 charges seven hundred thirty-three pounds (733 lbs.) of granulated white refined sugar which has been pulverized in a mechanical impact, air-classifier mill such that 95 to 97 percent passes through a 325 mesh screen, and not greater than 1 percent is retained on a 200 mesh screen, to a ribbon blender. Sixty-seven pounds (67 lbs.) of spray dried 10DE maltodextrin, 0.688 lbs. of FD&C Red #40 dye, and 18.422 lbs. of FD&C Yellow #5 dye are added to the mixer and the combined mass is dry blended for one minute. Twenty and one-half pounds (20.5 lbs.) of water at ambient temperature is atomized into this dry blend with agitation. The combined mass is mixed for an additional five minutes. An orange extrudate containing 2.333 percent total dye on a dry solids basis (dsb) is produced.

Example 14 substitutes the orange formulation of Example 13 with 5.842 lbs. of FD&C Red #40 dye. This example produces a red extrudate containing 0.725 percent total dye dsb.

Example 15 substitutes the colorants in the orange formulation of Example 13 with 14.248 lbs. of FD&C Yellow #5 dye. This example produces a yellow extrudate containing 1.750 percent total dye dsb.

The feed sugar admixtures all contain greater than 2.4 percent, but less than 2.5 percent, moisture on a wet weight basis and have 10DE maltodextrin contents of about 8.0 percent on a dry weight basis. The respective extrudates are cooled and ground such that 92 to 98 percent passes through a 100 mesh screen (150 micron opening) and produce free-flowing, nonhygroscopic, fine flours having moisture contents of about 0.35 percent.

These examples dry blend a crystalline sucrose substrate with nonsucrose solids in dry form. All moisture added to the blend is added as pure water.

These examples also demonstrate the unexpected discovery that products made by the process of the present invention, which contain at least 6 percent of a low DE equivalent maltodextrin, can be reground to a fine granulation without caking. It is believed that the maltodextrin is primarily on the surface of the microcrystals and, thereby, functions as a moisture barrier.

The color dispersion products of these examples are useful in continuous or batch color metering operations and for imparting a tint to dry mixes. For instance, the orange powder of Example 13 is useful as a colorant for carrot cake mixes and, thereby, lends an appealing tint to the flour blend. In a similar fashion, the red powder of Example 14 can be used in strawberry cake mixes. The yellow powder of Example 15 can be used in lemon cake mixes.

EXAMPLE 16

The following is an example of an alternative embodiment of the invention. The same procedures and equipment as described for Example 1 are used for this example. This example provides a desirable fruit characterizing ingredient.

A powdered sugar substrate of the same quality and amount as used in Example 1 was charged to a ribbon blender. Seventy-four pounds (74 lbs.) of a 72 percent Brix raspberry juice concentrate and 16 pounds of a 50 percent solids color and raspberry flavor emulsion are sequentially added to the powdered sugar substrate with agitation.

The feed sugar admixture contains 2.6 percent moisture on a wet weight basis and has a raspberry juice solids content of 5.0 percent on a dry weight basis. The final product has a moisture content of 0.24 percent.

The product of this example imparts fruit flavor to other food formulations. The product can also be used as a bakery fondant in the preparation of raspberry icings or as a directly compressible excipient for the manufacture of fruit flavored chewable vitamins.

EXAMPLES 17 & 18

The following are examples of alternative embodiments of the invention. The same procedures and equipment as described for Example 1 are used for these examples. These examples provide desirable powdered sports drink mixes.

Example 17 charges one thousand pounds (1,000lbs.) of granulated, white, refined sugar, which had been milled to a particle size distribution such that 50 to 55 percent passes through a 200 mesh screen, about 70 to 75 percent passes through a 150 mesh screen, and about 85 to 90 percent passes through a 100 mesh screen, to a ribbon blender. Also added to the mixer are 40.5 lbs. of citric acid, 1.4 lbs. of ascorbic acid, 30.2 lbs. of a selected mineral mix, including sodium citrate, potassium chloride, tricalcium phosphate magnesium gluconate, and calcium chloride, and 14.7 lbs. of a spray dried lemon-lime flavor, including gum arabic, 10DE maltodextrin, natural lemon-lime essential oils and flavorings, FD&C Yellow #5 and Blue #1, clouding agent, and a natural tocopherol antioxidant. These added ingredients are premilled to the same particle size distribution as the sugar. The combined mass is then dry blended for one minute.

Thirty-three pounds (33 lbs.) of a simple sucrose syrup is heated to 120° F. and sprayed as fine droplets into the dry blend with agitation. The combined mass was mixed for an additional five minutes. This feed sugar admixture contains 1.0 percent moisture on a wet weight basis and has a sucrose purity level of 92 percent on a dry weight basis.

The equipment and procedures of this example are the same as those for Example 1, except that the jacket temperatures for zones four, five, and six are reduced to 200° F., 210° F., and 220° F., respectively. The extrudate has a uniform composition and appearance. The final product is the "cut" that passes through a 1.19 millimeter screen opening (14 mesh), but is retained by a 250 micron screen opening (60 mesh). The product is an instantly soluble, free-flowing agglomerate having a moisture content of 0.43 percent and a representative lemon-lime color and flavor.

Example 18 substitutes the spray dried lemon-lime flavor with a liquid emulsion prepared from the water portion of the simple syrup into which all of the ingredients making up the composition of the spray dried flavor are homogenized. This liquid flavor emulsion can be added to the formulation described in place of the simple syrup.

These examples demonstrate the use of a particle size distribution at the coarse end of the specified range for this invention. It further illustrates the use of a feed sugar moisture content and an extruder discharge zone temperature which are both at the low ends of their specified ranges. In the presence of the relatively high acid levels common to drink mix formulations, these three range extremes allow feed sugars to be processed without the significant inversion or degradation of sucrose which otherwise damages the physical, compositional, and aesthetic integrity of the final product.

EXAMPLE 19

The following is an example of an alternative embodiment of the invention. The same procedures and equipment as described for Example 1 are used for this example, except for the cooker-extruder. This example provides a desirable, powdered, brown sugar.

Example 1 is repeated with the only change being that an Extru-Tech Model E750 single-screw cooker-extruder is used. The average residence time in the extrusion section per pound of product is about one second. A desirable brown sugar is produced. This example illustrates that the average residence time is inversely proportional to the size (screw-shaft diameter) of the cooker-extruder.

EXAMPLE 20

The following is an example of an alternative embodiment of the invention. The same procedures and equipment as described for Examples 1 and 2 are used for this example. This example provides a desirable, powdered, natural sweetener.

Central American panella sugar, which is also known as whole sugar cane juice solids or concrete sugar, having a composition of 88.5 percent sucrose, 4.2 percent reducing (invert) sugars, 1.8 percent ash, 2.7 percent organic nonsugars, and 2.8 percent moisture is pulverized to the same particle size distribution as that provided in Example 2. No other moisture or nonsucrose solids containing ingredients are added to this powdered sugar substrate. The final product has a moisture content of 0.38 percent.

This example provides a specific embodiment of the invention wherein all of the desired soluble nonsugar solids and moisture content are derived from those components already present within an impure crystalline sugar.

EXAMPLE 21

The following is an example of an alternative embodiment of the invention. The same procedures and equipment as described for Examples 1, 3 and 20 are used for this example. this example provides a desirable, powdered, off-white or yellow sugar.

Louisiana demerara crystals, which are also known as plantation granulated or edible raws, having a composition of 95.7 percent sucrose, 1.8 percent reducing sugars, 0.4 percent ash, 0.6 percent organic nonsugars, and 1.5 percent moisture are pulverized to the same particle size distribution as is specified in Example 13. The powdered sugar substrate is processed in the same manner as in Example 20. The final product has a moisture content of 0.16 percent and is a desirable, powdered, brown sugar.

EXAMPLE 22

The following is an example of an alternative embodiment of the invention. The same procedures and equipment as described for Examples 1, 20 and 21 are used for this example. This example provides a desirable, blended, powdered, brown sugar.

Brazilian muscovado sugar having a composition of 83.9 percent sucrose, 7.0 percent reducing sugars, 1.1 percent ash, 4.3 percent organic nonsugars, and 3.7 percent moisture is too high in both total nonsucrose solids and water content to be processed in accordance with the present invention. Equal weight quantities of this muscovado sugar and the plantation granulated sugar from Example 20 are blended together to yield a mix containing only 7.6 percent nonsucrose solids and a moisture level of 2.6 percent. From this point, the blend of muscovado and plantation sugars is pulverized and processed in the same manner as Example 20. The final product has a moisture content of 0.29 percent.

I claim:

1. A process for preparing a recrystallized sugar product, comprising:
    combining a powdered feed sugar with an adjuvant in a mixer, to provide a sugar blend of up to about 3% moisture;
    mixing the sugar blend with sufficient high shear, and at a sufficient temperature and positive pressure, to uniformly mix the sugar and the adjuvant throughout the sugar blend; and
    dispensing the sugar blend from the mixer;
    wherein, upon discharge, an explosive decompression occurs, and the dispensed sugar blend rapidly dehydrates and expands to a friable solid.

2. The process of claim 1, further comprising controlling the temperature and pressure of the sugar blend at the dispensing end of the mixer such that, upon discharge, the dispensed sugar blend dehydrates to a friable solid having a moisture content of up to about 0.7 percent.

3. The process of claim 1, wherein the mixing step is performed at a temperature between about 220–300° F.

4. The process of claim 3, wherein the residence time of the sugar blend in the mixer is about 0.5–12 seconds.

5. The process of claim 1, further comprising maintaining the pressure at the dispensing end of the mixer at about 20–1,200 psi.

6. The process of claim 1, further comprising drawing a vacuum at the dispensing end of the mixer to dehydrate the sugar blend.

7. The process of claim 6, wherein the mixing step is performed in a jacketed high shear mixer to mechanically mix the sugar blend, and heat and then cool the sugar blend before dispensing the sugar blend from an end of the mixer.

8. The process of claim 1, wherein the mixing step is performed in a cooker-extruder.

9. The process of claim 1, further comprising, after the combining step, feeding the sugar blend under positive pressure to an extruder for mixing.

10. The method of claim 1, further comprising comminuting the dispensed sugar blend to a finely divided product.

11. The process of claim 1, wherein the powdered feed sugar is sucrose.

12. The process of claim 1, wherein the adjuvant is water.

13. The process of claim 1, wherein the adjuvant is an aqueous solution of an edible solid.

14. The process of claim 13, wherein the adjuvant is selected from the group consisting of sucrose, invert syrup, honey, maple syrup, malt extract, sweet sorghum syrup, sugar cane juice concentrate, sugar beet juice concentrate, fruit juice concentrate, refiners syrup, molasses, and combinations thereof.

15. The process of claim 13, wherein the adjuvant is a starch conversion product selected from the group consisting of maltodextrin, regular corn syrup, high fructose corn syrup, dextrose, fructose, and mixtures thereof.

16. The process of claim 13, wherein the adjuvant is a polyol selected from the group consisting of glycerine, xylitol, mannose, sorbitol, mannitol, a hydrogenated conversion product, and mixtures thereof.

17. The process of claim 1, further comprising combining the sugar blend with an additive selected from the group consisting of an artificial flavor, artificial color, natural flavor, natural color, botanical flavor extractive, artificial sweetener, pharmaceutical agent, gum, hydrocolloid, and mixtures thereof.

18. The recrystallized sugar product produced by the process of claim 1.

19. A process for recrystallizing sugar, comprising:
    combining a powdered feed sugar with an adjuvant in a mixer, to provide a sugar blend of up to about 3% moisture;
    mixing the sugar blend with sufficient high shear, and at a sufficient temperature and pressure, to mechanically fluidize the sugar blend and uniformly disperse the sugar and the adjuvant throughout the sugar blend;
    dispensing the sugar blend from the mixer into atmosphere, such that, upon discharge, an explosive decompression of the sugar blend occurs, moisture is rapidly released from the dispensed sugar blend, and the sugar blend explosively expands to a friable solid having a crystallinity different than the powdered feed sugar.

20. The process of claim 19, wherein the dispensed sugar blend undergoes spontaneous recrystallization to provide a sugar product that is porous crystals uniformly coated with a non-sucrose solid.

21. A process for providing a recrystallized sugar product, comprising:
    combining a powdered sucrose with an adjuvant to provide a sucrose blend having up to about 3% moisture,
    mixing the sucrose blend with sufficient high shear, and at a sufficient temperature and positive pressure, to uniformly mix the sugar and the adjuvant throughout the sucrose blend;
    dispensing the sucrose blend from the mixer such that, upon discharge, an explosive decompression occurs, and the dispensed sucrose blend rapidly dehydrates and expands to a friable solid.

* * * * *